United States Patent [19]

Öberg et al.

[11] Patent Number: 4,579,617
[45] Date of Patent: Apr. 1, 1986

[54] METHOD OF MANUFACTURING TANKS, CONTAINERS, PIPES, ETC.

[75] Inventors: Lars-Gunnar Öberg, Frölunda; Bo W. Carlsson, Gråbo; Anders Bjurling, Bjurling, all of Sweden

[73] Assignee: Dynatrans Technology, Ltd., Douglas, Isle of Man

[21] Appl. No.: 622,231

[22] Filed: Jun. 19, 1984

[30] Foreign Application Priority Data

Jun. 27, 1983 [SE] Sweden ............................. 8303650

[51] Int. Cl.⁴ .......................................... B61H 81/00
[52] U.S. Cl. .................................. 156/184; 156/190; 156/215; 156/218; 156/272.2; 156/309.9; 156/322; 215/12 A; 215/13 R; 220/3.1; 220/466
[58] Field of Search ............... 156/171, 172, 190–192, 156/195, 186, 187, 184, 212, 215, 69, 218, 309.9, 322, 272.2; 220/3.1, 466, 421; 215/12 A, 13 R

[56] References Cited

U.S. PATENT DOCUMENTS

| | | | |
|---|---|---|---|
| 3,372,075 | 3/1968 | Holt et al. | 156/192 X |
| 3,392,865 | 7/1968 | Dryden | 220/421 X |
| 3,650,868 | 3/1972 | Murota | 156/425 X |
| 3,655,468 | 4/1972 | Bastone et al. | 156/192 X |
| 3,854,620 | 12/1974 | Saidla | 220/414 X |
| 4,118,814 | 10/1978 | Holtom | 156/191 X |

*Primary Examiner*—David Simmons
*Attorney, Agent, or Firm*—Laurence R. Brown

[57] ABSTRACT

Tanks, containers, pipes, etc., of sandwich construction may be manufactured by winding an inner sheet (3) onto a rotating mandrel (1), by then winding a hard insulation (8) which has been softened by heating in a microwave oven (9) onto the adhesive-coated inner sheet, and finally by winding a cover sheet (12) onto the adhesive-coated insulation layer.

6 Claims, 6 Drawing Figures

METHOD OF MANUFACTURING TANKS, CONTAINERS, PIPES, ETC.

TECHNICAL FIELD

The present invention relates to a method of manufacturing tanks, containers, pipes, etc.

STATE OF THE ART

A previously known method of manufacturing a tank, on which the present invention may be said to be based, is to weld up from sheet material an inner tank, to provide said inner tank with insulation in the form of bonded, preformed sheets of hard insulation, and if necessary to provide the insulation with a bonded and-/or welded covering sheet.

An inner tank of welded construction will require the use of sheet of a considerable thickness—at least 1 mm—and will thus be both heavy and expensive, the latter also being attributable to the difficulties encountered in mastering the problem of welding shrinkage and thus in achieving a tank of the desired size.

Furthermore, to preform the insulation for the inner tank starting from sheets is both time-consuming and difficult, especially if infrared technology or hot water is used for the necessary heating of the hard sheets.

The final result is a comparatively heavy, expensive, and in many instances less dimensionally accurate product.

THE INVENTION

A lighter, cheaper and better product will be obtained by the use of the method of manufacture in accordance with the invention, which is characterized by the following consecutive stages:

(a) winding of an inner sheet onto a mandrel which is subsequently removed;

(b) application to the inner sheet, which has been coated evenly with an adhesive, of a layer of softened, hard insulation; and (c) winding onto the insulation, which has been coated evenly with adhesive, of a covering sheet.

The lighter weight of a tank manufactured in this way may be attributed to, amongst other things, the fact that the sheet material used may be very much thinner—even as thin as 0.5 mm or less, since the necessary strength will be achieved from the bonded sandwich construction.

In order to avoid the problem and the difficulty associated with the heating/softening of the hard insulation made up of vinyl cell sheets, the heating required in accordance with the invention may be provided by means of microwaves, preferably by passing the insulation through a microwave oven.

It is clear that this method of manufacture is very suitable, thanks to its simplicity, also for designs where there is no requirement for insulation. The insulating layer, which can be made thin—perhaps 1 cm, will then become a load-bearing part of the sandwich structure.

If the items to be manufactured are tanks and containers, etc., the wound body shall be provided with ends manufactured with the same sandwich construction as the body.

The method in accordance with the invention is also suitable for the manufacture of pipes, in conjunction with which the windings on the mandrel may be applied in the form of a spiral.

BRIEF DESCRIPTION OF THE DRAWING

The invention is described in greater detail below with reference to the accompanying drawing, in which FIGS. 1-6 in diagrammatic form illustrate different stages in the method of manufacture in accordance wth the invention, with particular application to a tank with domeshaped ends.

DESCRIPTION OF A PREFERRED EMBODIMENT

The method in accordance with the invention can be utilized for the manufacture of tanks, containers and pipes, etc., of sandwich construction, but is described here as utilized for the manufacture of a cylindrical tank, for example a container tank.

For the purposes of this manufacture use is made of a cylindrical mandrel 1 capable of rotating about its longitudinal axis, open at one end and provided with, for example, a hemispherical end part 2 (see FIG. 2) at its other end. The mandrel 1 is best made of metal and manufactured accurately with regard to its dimensions and external finish. Its diameter may be increased (for the manufacture of tanks of larger diameters) by rolling a hard rubber mat onto the mandrel; in this way a limited number of mandrels will be required for tanks of different diameters.

Figures 1, 2:
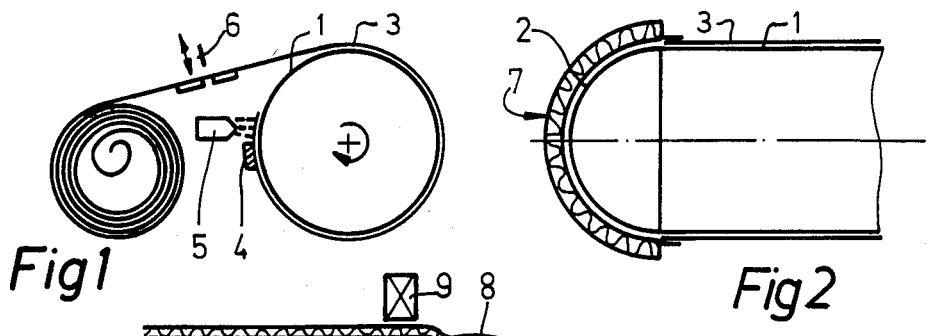

The first manufacturing operation, which is illustrated in FIG. 1, consists of winding onto the mandrel 1 a single turn of an inner sheet 3 (for example, taken from a coil of this material having the same direction of curvature as the mandrel). The width of the sheet is the same as the length of the mandrel. For the purpose of holding the sheet 3 in position during the winding operation use is made of a guide 4 with the same length as the width of the sheet an thus as the length of the mandrel. Ahead of the guide in the direction of winding is a short overlap (e.g. 50 mm), which at the end of the winding operation is provided over its entire area with adhesive via an adhesive spray 5. This may, if necessary, be resistant to lactic acid or citric acid, etc., depending on the proposed contents of the tank.

The sheet 3 is cut by means of a cutting wheel 6 with an anvil. The cutting wheel runs parallel with the axis of the mandrel. The sheet is placed against the overlap and is taped, if necessary, in order to hold it in position. The guide 4 is then removed.

The inner sheet 3 will now be of the correct length, but any adjustment can be made by the use of cutting wheels at either end, at right-angles to the axis of the mandrel 1.

The next manufacturing operation, which is illustrated in FIG. 2, consists of installing a separately manufactured end element 7 having the same sandwich construction as the cylindrical component (as described below). The inner sheet of the end element exhibits an overlap over the inner sheet of the cylindrical component, as may be appreciated from FIG. 2. Adhesive will have been applied to this overlap before the end element 7 is installed. The end element is taped into position, if necessary, to the cylindrical inner sheet so as to facilitate the following stages of manufacture.

Figure 3:
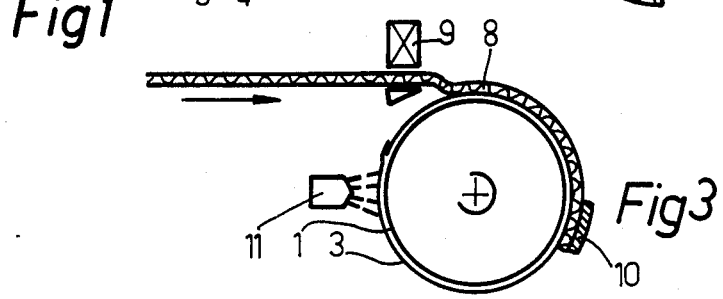

The next stage is that illustrated in FIG. 3, this being the application of an insulating layer 8 having a thickness which may vary from, say, 1 cm in the absence of any requirement for insulating capacity to 10 cm where full insulation is required.

The insulating material used should preferably be a vinyl cell material (Divinylcell ® or similar), which is supplied in sheets in view of its rigidity. A sheet of this kind may ideally have the same width as the length of the mandrel 1 (the cylindrical part) and the same length as the circumference of the mandrel.

In order to facilitate its application the hard insulating material must be softened, which is achieved by moving the sheet from a stock of sheet material through a continuous microwave oven 9, in which heating up to 130°–150° C. takes place with only small power requirement.

Here, too, the material is held in position by means of a guide 10 having the same length as the mandrel 1. The softened insulating material 8 is fed onto the rotating mandrel 1 on top of the inner sheet 3, which has been coated with an even layer of adhesive by an adhesive spray 11. The adhesive used in this case—and also in the bonding operations specified below—may be a polyurethane adhesive or an epoxy adhesive or similar. The insulation is formed precisely to the shape of the mandrel, but will cool rapidly since the mandrel 1 is cold.

If it is necessary to use a number of sheets to cover the mandrel completely, the guide 10 should be moved to each new sheet.

It is, of course, important to achieve a good fit with the insulating layer of the end element 7.

The adhesive spray 11 may, for example, run on guides along the entire length of the mandrel 1, describing a to-and-fro motion as the mandrel rotates.

Figure 4:
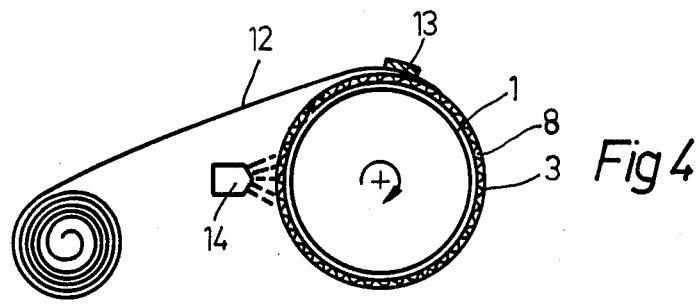

At the next stage, as shown in FIG. 4, a covering sheet 12 is applied in substantially the same way as the inner sheet 3 applied in the first stage, i.e. with an adhesive coated overlap ahead of a guide 13. If the sheet is not of the correct length, cutting may be performed, for example by means of a cutting wheel. Also at this stage, adhesive is applied in a uniform layer to the insulating layer 8 by means of an adhesive spray 14.

Figure 5:
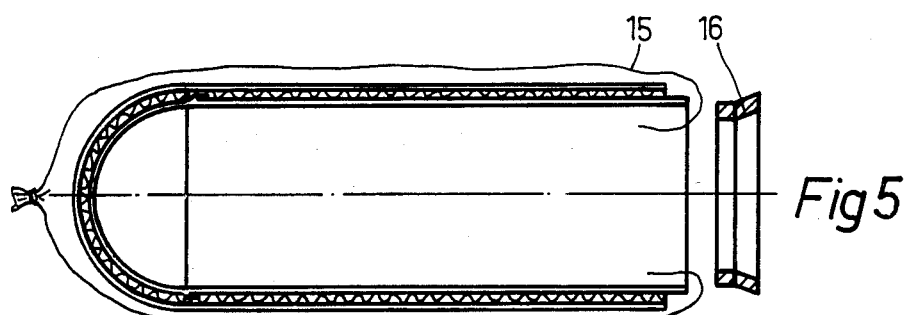

The tank component manufactured to this stage on the mandrel has the appearance illustrated in FIG. 5. In order to produce the necessary compression moulding pressure for the bonds between the different layers under vacuum, a plastic stocking 15 may be slipped over the entire mandrel, with a sealing ring being applied over the free end, and with an opening 17 being connected to the vacuum source until the adhesive has cured. The plastic stocking may then be removed.

The mandrel must be removed before the manufacture of the tank can be completed. Removal can be facilitated, for instance, by forcing compressed air or water into the space between the mandrel and the tank (water to be used only if the mandrel has been enclosed in a rubber mat as mentioned above).

Figure 6:
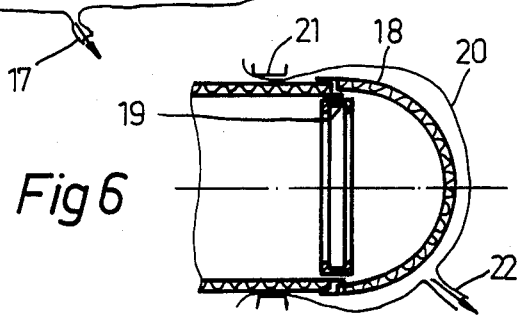

The final stage in the manufacture of the tank is illustrated in FIG. 6, this being the installation of a second end 18. This end, too, is premanufactured from an inner sheet, an insulation sheet and a covering sheet in the form of an integral sandwich construction. It is clear from FIG. 6 that the covering sheet of this end exhibits an overlap over the covering sheet of the cylindrical body.

In conjunction with the installation of the end, it may be necessary to have the internal support of a ring 19 which should be capable of being dismantled after installation of the end and of being removed through a hole in the tank, for example a manhole.

In this case, too, a plastic stocking 20 is slipped over the end 18 after the adhesive has been applied to the contact surfaces and is secured in position by means of a sealing ring 21 or possibly by means of tape. An opening 22 is connected to the vacuum source.

The mandrel used during manufacture may be of any desired cross-section, for example elliptical, square or rectangular, etc., and different types and sizes of tanks, cabinets and freight containers, etc., may be produced with advantage by this method.

Even pipes of sandwich constructions can be manufactured by a substantially continuous process by causing the inner sheet, the insulation and the covering sheet to be wound onto the mandrel in the form of a spiral. In this case, of course, the manufacture in accordance with the invention enables very thin sheet to be used, definitely of less than 1 mm in thickness, and in many cases of less than 0.5 mm in thickness, thanks to the ability to achieve the necessary strength from the use of sandwich construction based on hard insulation. (Designs of a more conventional nature definitely call for the use of sheet with a thickness in excess of 1 mm). The expression sheet is capable of wide interpretation in this context and is not restricted to metal sheet.

The entire manufacturing process may, by the choice of appropriate layout and peripheral equipment, take place at a single station, with the guide 4, 10 and 13 being a single guide and with the adhesive sprays 5, 11 and 14 being a single spray. The guide/guides may be replaced by inner vacuum cups or similar.

We claim:

1. The method of manufacturing strong light weight cylindrical bodies of tanks, containers or pipes comprising the steps of, unwinding a thin metallic sheet of a thickness less than one millimeter and a width comprising substantially the length of a cylindrical object to be manufactured to lie in a single layer about a cylindrical rotatable mandrel to form a single inner metallic sheet of uniform thickness about the mandrel, cutting the sheet to a length substantially equal to the circumference of the mandrel, coating the outer surface of the metallic sheet about the mandrel with a layer of adhesive, conforming rigid vinyl cellular insulation sheet material of a thickness greater than one centimeter and a width substantially that of the metallic sheet to adhere to the adhesive coating about the thin metallic sheet on the mandrel by heating the insulation material by passing it continuously through a microwave oven heating the sheet to a range between 130° to 150° C. to heat the sheet enough to soften it for conforming about the cylindrical surface and holding it in place about the cylindrical to form a single cylindrical layer, coating the outer surface of the insulation material layer on the mandrel with adhesive, unwinding a thin sheet of outer cover material protecting the insulation material about the adhesively coated insulation outer surface to form a single cover layer of substantially uniform thickness to form the cylindrical body, and removing the cylindrical sandwiched body of insulation between inner and outer layers from one end of the mandrel thereby to free the mandrel for manufacture of another cylindrical body.

2. The method of claim 1 wherein a plurality of insulation sheets cover the metallic sheet.

3. The method of claim 2 wherein the inner metallic sheet and the cover material sheet are slightly overlapped and held together by adhesive.

4. The method of claim 3 including the step of subjecting the layers to compression molding pressure under vacuum before removing from the mandrel.

5. The method of claim 4 including using a guide along the axis of the mandrel for holding the sheets in place on the circumference of the mandrel during unwinding.

6. The method of claim 5 including the additional step in removal of the cylindrical body from the mandrel by forcing compressed fluid between the mandrel and the cylindrical body.

* * * * *